(12) United States Patent
Leplae et al.

(10) Patent No.: US 9,328,208 B2
(45) Date of Patent: May 3, 2016

(54) PVC REINFORCED COMPOSITES

(75) Inventors: Alain Leplae, Moorsele (BE); Danny Gonnissen, Roeselare (BE); Filip Acx, Oostkamp (BE); David Verstraete, Handzame (BE)

(73) Assignee: NV BEKAERT SA, Zwevegem (BE)

( * ) Notice: Subject to any disclaimer, the term of this patent is extended or adjusted under 35 U.S.C. 154(b) by 0 days.

(21) Appl. No.: 13/697,930

(22) PCT Filed: May 9, 2011

(86) PCT No.: PCT/EP2011/057428
§ 371 (c)(1),
(2), (4) Date: Nov. 14, 2012

(87) PCT Pub. No.: WO2011/144482
PCT Pub. Date: Nov. 24, 2011

(65) Prior Publication Data
US 2013/0066001 A1    Mar. 14, 2013

(30) Foreign Application Priority Data
May 18, 2010  (EP) .................................... 10163049

(51) Int. Cl.
*C08L 27/06* (2006.01)
*C08J 5/06* (2006.01)
*B29C 47/00* (2006.01)
*B29C 47/06* (2006.01)
*E04C 3/29* (2006.01)
*B29C 47/02* (2006.01)

(52) U.S. Cl.
CPC .................. *C08J 5/06* (2013.01); *B29C 47/003* (2013.01); *B29C 47/0014* (2013.01); *B29C 47/0016* (2013.01); *B29C 47/065* (2013.01); *E04C 3/29* (2013.01); *B29C 47/0021* (2013.01); *B29C 47/0045* (2013.01); *B29C 47/025* (2013.01); *B29C 47/067* (2013.01); *C08J 2327/06* (2013.01)

(58) Field of Classification Search
CPC ............ B29C 47/0014; B29C 47/0016; B29C 47/003; B29C 47/065; E04C 3/29; C08J 5/06
USPC ........................................................ 524/284
See application file for complete search history.

(56) References Cited

U.S. PATENT DOCUMENTS

| 4,740,405 A | 4/1988 | Tanaka et al. |
| 5,258,232 A * | 11/1993 | Summers et al. ............ 428/463 |
| 7,241,484 B2 | 7/2007 | Van Dijk et al. |

(Continued)

FOREIGN PATENT DOCUMENTS

| CN | 1431952 A | 7/2003 |
| EP | 0 758 427 B1 | 7/2001 |
| WO | WO 91/10024 A1 | 7/1991 |

(Continued)

*Primary Examiner* — Ling Choi
*Assistant Examiner* — Lanee Reuther
(74) *Attorney, Agent, or Firm* — Foley & Lardner LLP

(57) ABSTRACT

The invention relates to a reinforced composite having an unplasticized polyvinyl chloride (PVC) matrix reinforced by means of elongated steel element provided with a coating of acrylate based polymer. The yield strength of elongated steel element of the present invention at 0.01% permanent elongation is at least 1500 MPa. The invention also relates to In one aspect, the present invention relates to a reinforced composite having an unplasticized PVC matrix reinforced by means of elongated steel element, wherein said elongated steel element is coated with a layer of acrylate based polymer followed by a coating of tie layer, wherein said tie layer comprises a mixture of PVC and a plasticizer.

14 Claims, 4 Drawing Sheets

(56) References Cited

U.S. PATENT DOCUMENTS

2002/0037409 A1* 3/2002 Tunis ........................... 428/375
2003/0090023 A1* 5/2003 Suzuki et al. ................. 264/129

FOREIGN PATENT DOCUMENTS

| WO | WO 95/30815 A1 | 11/1995 |
| WO | WO 01/98077 A2 | 12/2001 |

* cited by examiner

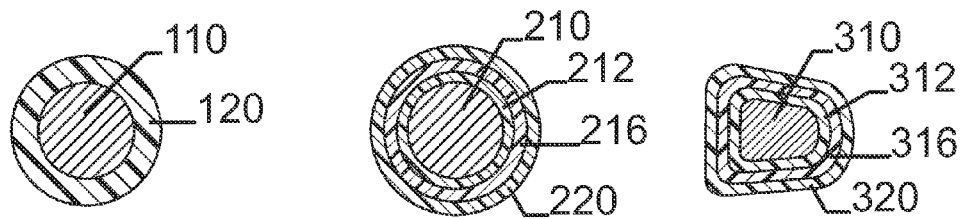
Prior Art
Fig. 1
Fig. 2
Fig. 3
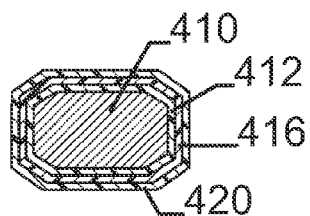
Fig. 4
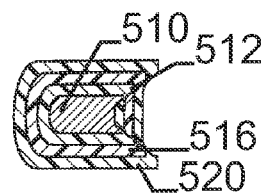
Fig. 5
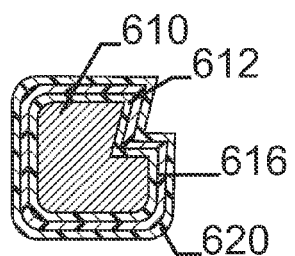
Fig. 6
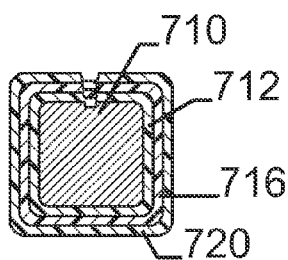
Fig. 7
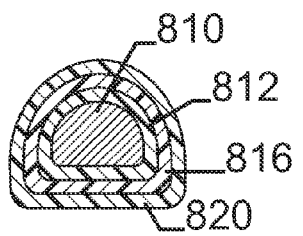
Fig. 8
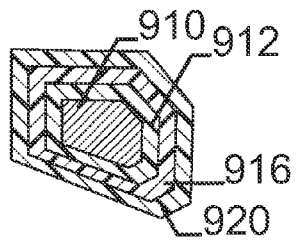
Fig. 9

PVC REINFORCED COMPOSITES

TECHNICAL FIELD

The present invention relates to a polyvinyl chloride (PVC) reinforced composite. It also relates to a method to manufacture the rigid polyvinyl chloride (PVC) reinforced composite.

BACKGROUND ART

Reinforced profiles are widely known, for instance WO 91/10024, EP 0758427, U.S. Pat. No. 4,740,405 and U.S. Pat. No. 7,241,484 describe plastic profile with reinforcing elements. Reinforcing elements constitute wide range of materials such as carbon fibers, glass fibers, metal plates or metal rods. Reinforced profiles are prepared using pultrusion technique, plastic hollow profiles are prepared initially and in the subsequent step of the process, the reinforcing element, being a metal rod, plate or short fibers from glass or carbon are inserted in to the hollow profiles. Such profiles described in prior art do not have any adhesion between the plastic matrix and the reinforcement. The choice or selection of reinforcing elements and profiles is based on the aesthetic appearance and properties imparted to the profiles such as thermal properties, wind-resistance and maintenance costs. In order to make complex profiles of various shapes and sizes, the reinforcing elements have to be chosen such that said reinforcing element imparts reduced weight; provide rigidity and excellent adhesion to the reinforced profile. Furthermore complex profiles require the freedom of positioning the reinforcing elements within the composite. In composites it is important that the forces are transferred between the reinforcement and the plastic component. Therefore strong adhesion between the plastic matrix and the reinforcement is important.

DISCLOSURE OF INVENTION

It is an object of the present invention to provide a lightweight and rigid PVC reinforced composite having an excellent adhesion between the reinforced elements and the rigid PVC matrix. In one aspect of the invention the PVC is preferably recycled PVC matrix.

It is a further object of the present invention to provide a rigid reinforced PVC profile wherein the reinforcement with steel wires is of low friction.

In one aspect, the present invention relates to a reinforced composite having a rigid PVC matrix reinforced by means of elongated steel element, wherein said elongated steel element is coated with a layer of acrylate based polymer. The yield strength of said elongated steel element at 0.01% permanent elongation is at least 1500 MPa. One of the advantages of the present invention is that the reinforcing elements have a diameter of 1.5 mm to 4 mm, complex profiles can be made due to the fact that the reinforcing elements can be positioned at different places within the composite.

In one aspect, the present invention relates to a reinforced composite having a rigid polyvinyl chloride (PVC) matrix reinforced by means of elongated steel element, wherein said elongated steel element is coated with a layer of acrylate based polymer followed by a coating of tie layer, wherein said tie layer comprises a mixture of PVC and a plasticizer. The advantage of such a composite is that the reinforced elongated steel elements provide excellent adhesion characteristics to the PVC matrix. The advantage of using tie layer is that the tie layer melts into the other rigid PVC material during extrusion.

In one aspect, the present invention relates to a method of manufacturing the reinforced composite of claim 1 comprising the steps of: (i) subjecting the steel wire to austenization, quenching and tempering process; (ii) applying the coating of acrylate based polymer by dipping the elongated steel element into the adhesion promoting agent bath; (iii) reinforcing the steel wire in to a PVC polymer matrix by extrusion.

In one aspect, the present invention relates to use of reinforced composite for variety of applications such as wall paneling for houses, optically closed fencing, terrace flooring, flooring around swimming pools, in marinas, garden houses, footboards, window sills, ducts, tubes and gutters.

BRIEF DESCRIPTION OF FIGURES IN THE DRAWINGS

FIG. 1 shows a reinforced composite according to the prior art.

FIG. 2-17 shows different embodiments of reinforced composite according to the invention.

Figure 18A:
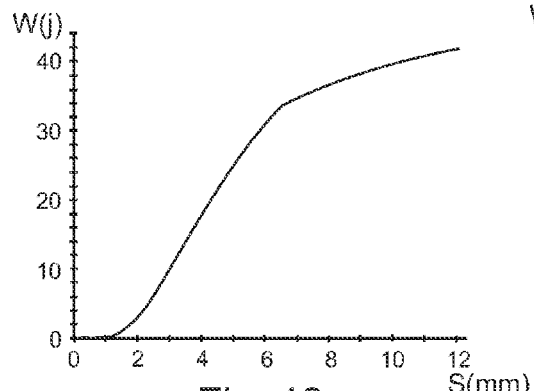
Figure 18B:
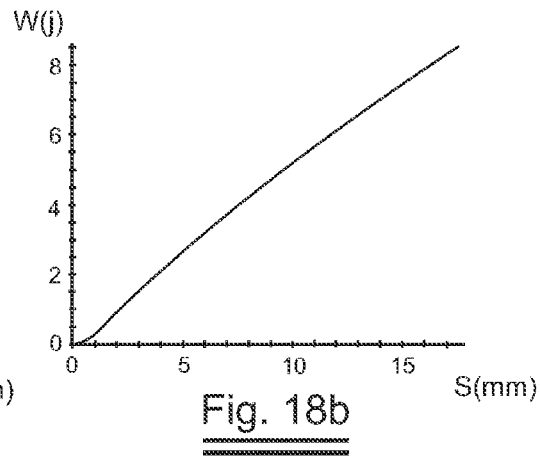
Figure 18C:
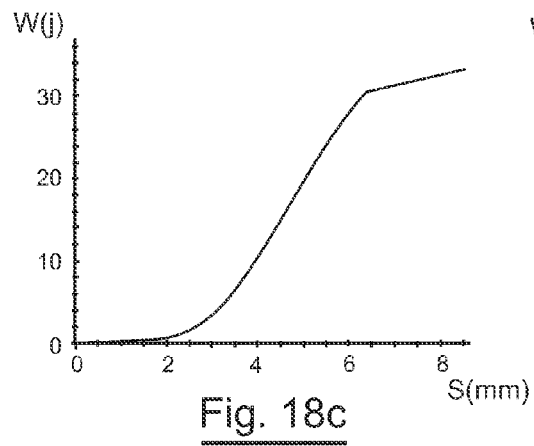
Figure 18D:
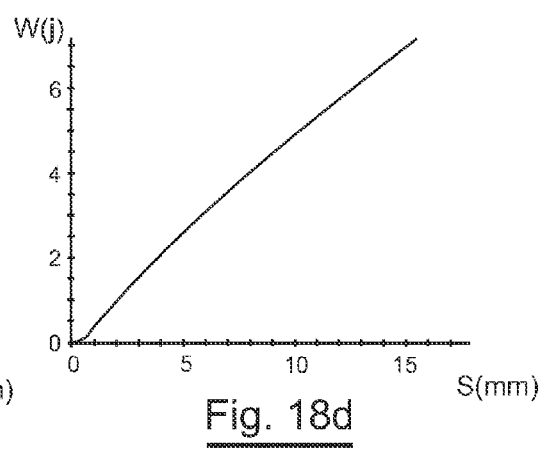
Figure 18E:
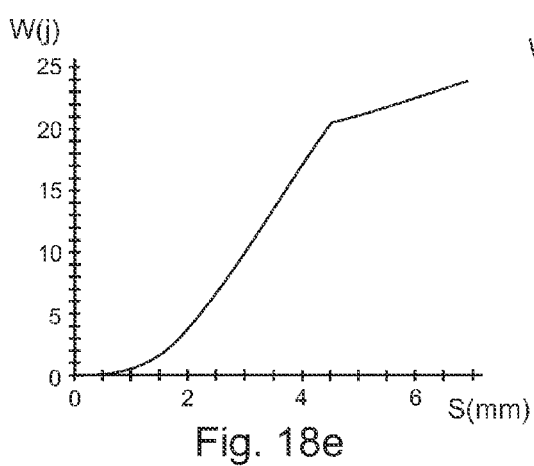
Figure 18F:
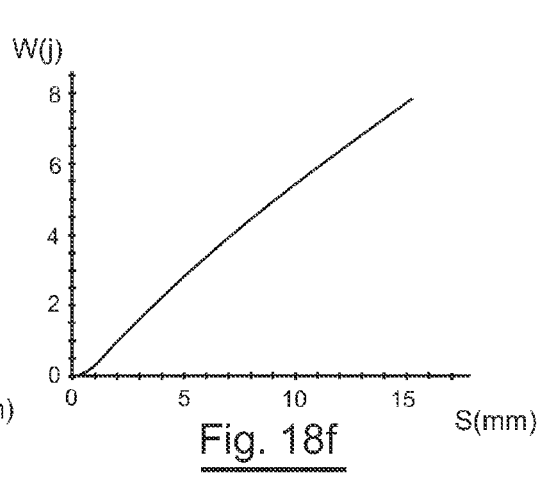

FIGS. 18a, 18c and 18e refer to a reinforced composite according to the invention (see FIG. 2) and FIGS. 18b, 18d and 18f refer to a reinforced composite according to the prior art (see FIG. 1). The diameter of the elongated steel element is 3 mm. "S" denotes strain measured in mm and "W" denotes work in Joule.

Figure 19A:
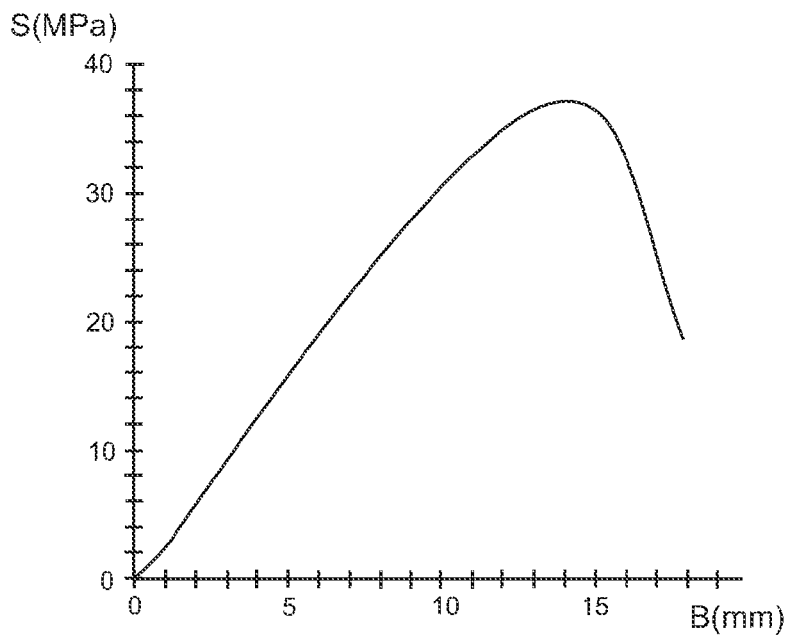
Figure 19B:
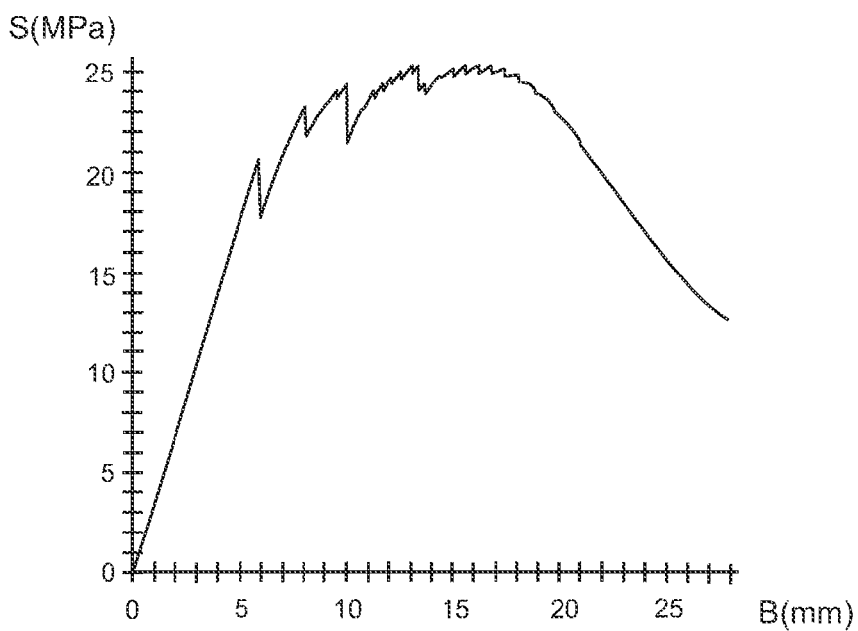

FIG. 19a refers to a reinforced composite according to the invention (see FIG. 2) and FIG. 19b refer to a reinforced composite according to the prior art (see FIG. 1). The diameter of the elongated steel element is 3 mm. "B" denotes bending measured in mm and "S" denotes stress in mega Pascal.

MODE(S) FOR CARRYING OUT THE INVENTION

FIG. 1 shows a reinforced composite according to the prior art. The composite contains an elongated steel element 110 on which rigid PVC are extruded 120.

The term "elongated steel element" may refer to a steel filament or a steel cord or a round wire, a profile wire, a strip, a sheet or a blade manufactured from a wire rod as starting material. The profile wire can be a flat wire, a rectangular wire, a square wire or other profile wire as shown in FIGS. 3 to 14. With "different types of elongated steel elements" is meant that the elongated steel elements differ from each other, e.g. comprising different wire diameters, having different cord constructions, being provided out of different steel alloys, having different mechanical properties.

FIG. 2-14 shows a reinforced composite having a PVC matrix reinforced by means of elongated steel element 210, 310, 410, 510, 610, 710, 810, 910, 1010, 1110, 1210, 1310 and 1410 respectively provided with a coating of acrylate based polymer 212, 312, 412, 512, 612, 712, 812, 912, 1012, 1112, 1212, 1312 and 1412 respectively followed by a tie layer 216, 316, 416, 516, 616, 716, 816, 916, 1016, 1116, 1216, 1316 and 1416 respectively wherein said tie layer comprises a mixture of PVC and a plasticizer. In addition the said reinforced composite of the invention is reinforced into a rigid PVC matrix 220, 320, 420, 520, 620, 720, 820, 920, 1020, 1120, 1220, 1320, and 1420 respectively which preferably may be performed by extrusion technique.

Figure 10:
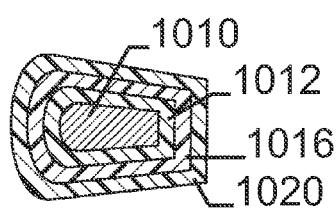
Figure 11:
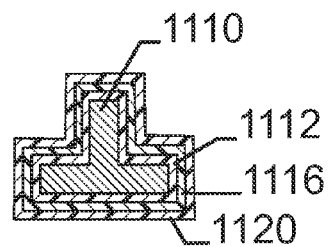
Figure 12:
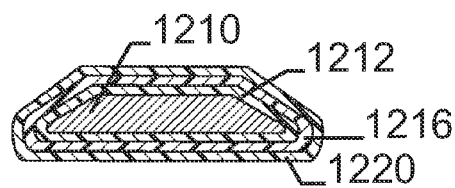
Figure 13:
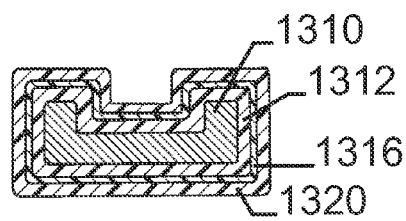
Figure 14:
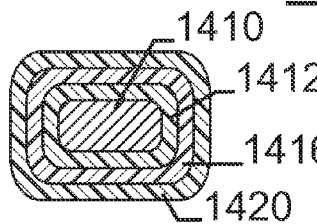
Figure 15:
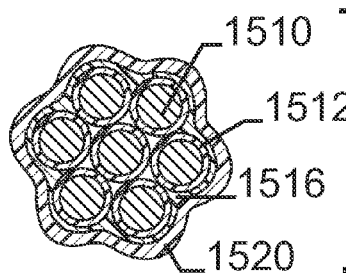

FIG. 15 shows a reinforced composite having a PVC matrix reinforced by means of bundle of elongated steel elements 1510 provided with a coating of acrylate based polymer 1512, followed by a tie layer 1516 wherein said tie layer comprises a mixture of PVC and a plasticizer. In addition the said reinforced composite of the invention is reinforced into a rigid PVC matrix 1520.

Figure 16:
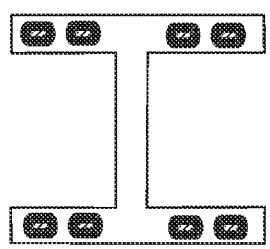

FIG. 16 shows an example of I-profile according to the invention.

Figure 17:
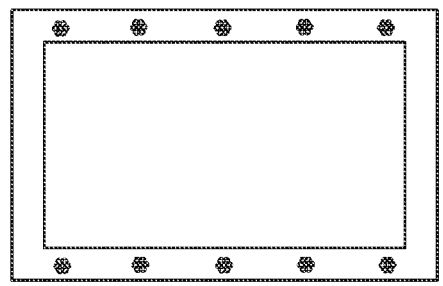

FIG. 17 shows another example of rigid PVC matrix reinforced profile according to the invention.

In one embodiment, the present invention relates to a rigid PVC reinforced composite, wherein said composite comprises a PVC polymer reinforced with plurality of steel wires and wherein diameter of said steel wire ranges from 1.5 mm to 4 mm, and wherein yield strength of said steel wire at 0.01% permanent elongation is at least 1500 N/m2/mpa, and wherein at least a portion of the said steel wire is pre-coated with a layer of acrylate based polymer followed by a tie layer, and wherein said tie layer comprises a mixture of PVC and an plasticizer.

In one embodiment, the yield strength of said elongated steel element of the present invention at 0.01% permanent elongation is at least 1500 MPa, preferably a martensitic structure having a tensile strength ranging from 1500 to 6000 Mpa, more preferably 1800 to 4000 Mpa, most preferably 2000 to 2800 Mpa.

The term "rigid PVC matrix" refers to unplasticized polyvinyl chloride.

The term "acrylate based polymer" refers to a group of polymers formed from acrylate monomers and may refer to, but not limited to acrylic acid, butyl acrylate, 2-ethylhexyl acrylate, methyl acrylate, ethyl acrylate, acrylonitrile, methyl methacrylate, and trimethylolpropane triacrylate (TMPTA). The acrylate polymer may be constituted in presence of solvent selected from the group consisting of xylene, ethanol, acetone, diacetone alcohol, phenol and mixtures thereof. In one embodiment of the present invention, the acrylate polymer is made from methyl methacrylate monomers. In addition, the polymer initiating compounds may be added further to polymerize the reaction, such polymer initiating compounds are known to a person skilled in the art.

The term "plasticizer" refers to that compound that increases the plasticity or fluidity of the PVC. In one embodiment of the present invention, the plasticizer is a phthalate. In one embodiment of the present invention, the plasticizer is selected from the group consisting of Di(2-ethylehexyl) phthalate, Di(n-octyl) phthalate, Diisononyl phthalate, Diisodecyl phthalate, Diundecyl phthalate, Diisoundecyl phthalate, Ditridecyl phthalate, Diisotridecyl phthalate and mixtures thereof. In one embodiment of the present invention, the plasticizer is a substitute of phthalate and is selected from the group consisting of acetyltributylcitrate, tributylcitrate, diisononyladipate and mixtures thereof. In one embodiment of the present invention, the tie layer comprises of plasticizer ranging from 5 to 35 wt %, preferably 10 to 30 wt %, more preferably 15 to 25 wt %.

The elongated steel element is manufactured as follows: The wire rod composition has preferably a carbon content ranging between a minimum carbon content of 0.60% and a maximum carbon content of about 1.10%, a manganese content ranging from 0.40% to 0.70%, a silicon content ranging from 0.15% to 0.30%, a maximum sulfur content of 0.03%, a maximum phosphorus content of 0.30%, all percentages being percentages by weight. Usually there are only traces of copper, nickel, aluminum, titanium, and nitrogen and/or chromium, except for very high tensile strengths.

The wire rod is cleaned by mechanical descaling and/or by chemical pickling in a H2SO4 or HCl solution in order to remove the oxides present on the surface. The wire rod is then rinsed in water and is dried. The dried wire rod is then subjected to a first series of dry drawing operations in order to reduce the diameter until a first intermediate diameter. At this first intermediate diameter the dry drawn steel wire is subjected to a first intermediate heat treatment, called patenting. The steel wire is then ready for further mechanical deformation. Thereafter the steel wire is further dry drawn from the first intermediate diameter until a second intermediate diameter in a second number of diameter reduction steps. The second diameter is reduced by 20-50%. At this second intermediate diameter, the steel wire is subjected to a second patenting treatment to allow for transformation to pearlite. Possibly one round steel wire goes through one or more adapted forming profile dies to obtain a flat steel wire.

In one embodiment of the present invention, the shape of said elongated steel element is selected from the group consisting of I-profiled, round, flat, square, rectangular, triangular, trapezoidal, oval, half-round and mixtures thereof. An I-profiled shape or H-profiled shape is a wire with cross section resembling an I-shape or H-shape. Precision rolling machines are used for flat rolling and profile rolling. The corners of shaped wires of the present invention can be naturally rolled, rounded, rectangular rolled or sharp or with specified corner radius. In one embodiment of the present invention, the composite will be reinforced with different shaped wires depending the application, for instance the composite will contain rounded wire and half round shaped wires, wherein at least one of shaped wire is provided with a coating of acrylate based polymer followed by a tie layer, wherein said tie layer comprises a mixture of PVC and a plasticizer.

The thickness of the acrylate based polymer layer is preferably no more than 1 μm, more preferably the thickness ranges from 5 nm to 1000 nm, most preferably the thickness ranges from 5 nm to 200 nm.

The thickness of the tie layer is determined by the requirement of the adhesion between the elongated steel element and the matrix of the thermoplastic material. Preferably the thickness of the tie layer ranges from 10 μm to 100 μm, and more preferably the thickness of the tie layer ranges from 30 μm to 50 μm.

Due to the reinforcement of the elongated steel element, the reinforced composite has a good stiffness and creep resistance.

According to a second aspect of the present invention, a method of manufacturing a reinforced composite is provided. The acrylate based polymer layer and the tie layer can be applied by any technique known in the art. Preferably the acrylate based polymer layer is applied by dipping the elongated metal element into the adhesion promoting agent bath. Subsequently, the coated elongated steel element can be dried.

Preferably the tie layer is applied upon the acrylate based polymer layer by applying the molten PVC which is softened with addition of plasticizer under high pressure onto the elongated steel element through an extrusion die, or by coating with a solution or emulsion of the tie layer on the elongated steel element and subsequently dried.

In one embodiment, the present invention relates to a method of manufacturing the reinforced composite of present invention comprising the steps of: (i) subjecting the steel wire to austenization, quenching and tempering process; (ii) applying the coating of acrylate based polymer by dipping the steel wire into the adhesion promoting agent bath; (iii) applying the coating of tie layer by extrusion and (iv) reinforcing the steel wire in to a rigid PVC matrix by extrusion.

Furthermore the method of manufacturing the reinforced composite may comprise drying, curing, forming and/or cutting to get the desired profile in cross-section for market or customers.

Due to the excellent adhesion between the elongated steel element and the PVC matrix, the reinforced composite is rigid and stable enough to be used for load bearing application, especially for housing, telephone poles, window, flexible ducts, flooring material, door frames, scaffold boards, shore reinforcement etc. Furthermore the reinforced composite is made into such profile with multiple hollow sections, particularly having thin walls. The high rigidity of the composite leads to higher elastic stability of the partitions between the multiple cavities that are loaded at pressure and shearing.

The reinforced composite may have the shape of I-profile, H-profile, or any other profile comprising a body and legs or arms in cross section. Additionally the reinforced composite may have the shape of tubular profile, multiple tubular profile, hollow profile, or multiple hollow in cross section.

The adhesion between the coated elongated steel element and the reinforced composite (PVC polymer) is measured by determining the pull out energy (POE) or 3-point bending test.

A certain length coated elongated steel element in the PVC polymer composite as described in the present invention is determined. The energy necessary to pull out the embedded coated metal element from the PVC polymer composite is measured. The adhesion of reinforcing element to the rigid PVC is directly proportional to the value of POE. Results show that in some of the samples tested, the adhesion is so strong that it is impossible to pull-out the coated elongated steel element due to primary failure of the PVC polymer composite. FIGS. 18a, 18b and 18c referring to the reinforced composite of the invention shows that energy required to pull out the elongated steel element is higher than that of the prior art (FIGS. 18b, 18d and 18f).

In case of the 3-point bending test, the composite is aligned on a horizontal rail with a pair of rollers and a force is applied at the center point of the PVC composite until 50% loss of the maximum stress is reached.

The PVC composite is subjected to bending as a result of the applied stress, bending rigidity and maximum stress are determined.

The adhesion of coated wire is reverse proportional to the bending rigidity and proportional with the maximum reached stress. FIG. 19 shows the maximum reached stress between the coated (see FIG. 2) and non coated wire (see FIG. 1). The slope of the graph is an indication for the bending rigidity.

Visual inspection of the axial cross-section of the PVC composite provides insight about the adhesion of steel wires to the rigid PVC composite, The coated elongated steel element stay on their original position after the 3-point bending test, while uncoated elongated steel element of the prior art protrude out of the extruded composite.

Any reference signs do not limit the scope of the claims.

The invention claimed is:

1. A reinforced composite having an unplasticized polyvinyl chloride (PVC) matrix reinforced by an elongated steel element, wherein said elongated steel element is coated with a layer of acrylate based polymer, said layer of acrylate based polymer is coated with a tie layer comprising a mixture of PVC and a plasticizer, and wherein said layer of acrylate based polymer and said tie layer are between said PVC matrix and said elongated steel element.

2. The reinforced composite of claim 1, wherein yield strength of said elongated steel element at 0.01% permanent elongation is at least 1500 MPa.

3. The reinforced composite of claim 2, wherein a shape of said elongated steel element is selected from the group consisting of I-profile, H-profile, round, flat, square, rectangular, triangular, trapezoidal, oval, half-round and mixtures thereof.

4. The reinforced composite of claim 1, wherein a shape of said elongated steel element is selected from the group consisting of I-profile, H-profile, round, flat, square, rectangular, triangular, trapezoidal, oval, half-round and mixtures thereof.

5. The reinforced composite of claim 4, wherein said elongated steel element is a round shaped steel wire and a diameter of said steel wire ranges from 1.5 mm to 4 mm.

6. The reinforced composite of claim 1, wherein said plasticizer is selected from the group consisting of Di(2-ethylehexyl) phthalate, Di(n-octyl) phthalate, Diisononyl phthalate, Diisodecyl phthalate, Diundecyl phthalate, Diisoundecyl phthalate, Ditridecyl phthalate, Diisotridecyl phthalate, acetyltributylcitrate, tributylcitrate, diisononyladipate and mixtures thereof.

7. The reinforced composite of claim 6, wherein an amount of said plasticizer ranges from 5 to 35 wt %.

8. A method of manufacturing the reinforced composite of claim 1 comprising the steps of:
 (i) cleaning a wire rod by mechanical descaling and/or chemical pickling followed by rinsing and drawing operation steps to produce an elongated steel element;
 (ii) subjecting the steel element to austenization, quenching and tempering process;
 (iii) applying the coating of acrylate based polymer by dipping the elongated steel element into an adhesion promoting agent bath;
 (iv) extruding the steel element and a PVC polymer matrix.

9. The method of claim 8, wherein said elongated steel element is provided with an another coating of tie layer by extrusion immediately after application of the layer of acrylate based polymer.

10. The method of claim 9, wherein thickness of the tie layer ranges from 10 μm to 100 μm.

11. The method of claim 9, wherein thickness of the acrylate based polymer is no more than 1 μm.

12. The method of claim 8, wherein thickness of the acrylate based polymer is no more than 1 μm.

13. Window profiles comprising the reinforced composite of claim 1.

14. Flooring comprising the reinforced composite of claim 1.

* * * * *